United States Patent

Humphrey

[15] 3,676,582

[45] July 11, 1972

[54] EMPHASIZED CARRIER CIRCUIT WITH INTEGRAL AFC OPERATION

[72] Inventor: John G. Humphrey, Chesapeake, Va.

[73] Assignee: General Electric Company

[22] Filed: March 3, 1971

[21] Appl. No.: 120,500

[52] U.S. Cl. ........................178/5.8 AF, 178/5.4 R, 325/418

[51] Int. Cl. ..........................................................H04n 5/50

[58] Field of Search ...............178/5.4, 5.8, 5.8 AF; 325/418, 325/419, 423

[56] References Cited

UNITED STATES PATENTS

| | | | |
|---|---|---|---|
| 2,595,931 | 5/1952 | De Groot | 325/418 |
| 2,702,343 | 2/1955 | Trevor | 325/423 |
| 2,989,581 | 6/1961 | Keizer et al. | 178/5.4 R |

*Primary Examiner*—Richard Murray

*Attorney*—James E. Espe, Francis H. Boos, Jr., Frank L. Neuhauser, Oscar B. Waddell and Joseph B. Forman

[57] ABSTRACT

A resonant circuit is coupled to the output of the final IF amplifier stage of a television receiver for emphasizing the picture carrier portion of the signal outputted by the IF amplifier. Filter means are provided for abstracting the picture carrier frequency from the IF signal applied to the input of the final amplifier stage. A discriminator compares the phase of the signal provided by the resonant circuit with that of the signal abstracted from the IF amplifier input, and applies an output signal reflecting the relationship therebetween to the tuner stage of the receiver to minimize any difference between the frequency of the picture carrier and that of the resonant circuit.

4 Claims, 1 Drawing Figure

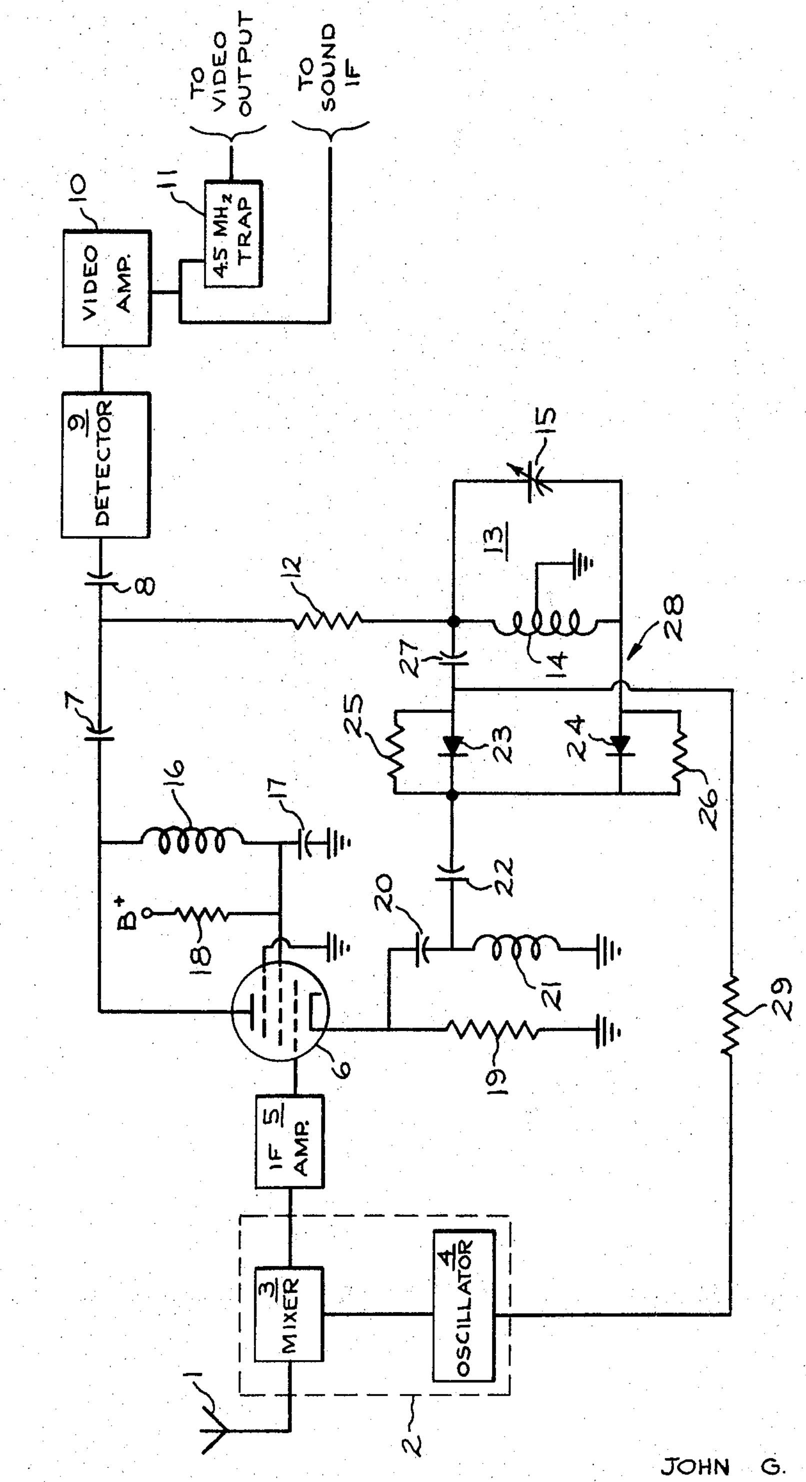
INVENTOR
JOHN G. HUMPHREY
BY James E. Espe
HIS ATTORNEY

EMPHASIZED CARRIER CIRCUIT WITH INTEGRAL AFC OPERATION

BACKGROUND OF THE INVENTION

The present invention relates to television receivers and, more particularly, to improved means for providing automatic frequency control (AFC) in a television receiver utilizing an emphasized-carrier detection scheme. In conventional color television receivers, two second detectors are employed; one for detecting the luminance and chrominance portions of an intermediate frequency (IF) signal, and another for deriving an audio signal therefrom. It has been proposed that a single second detector be utilized for deriving luminance, chrominance and audio information simultaneously from the IF signal. However, a problem which arises in single second detector systems in such a case is the appearance of distortions in the picture. These distortions are of two types; a phenomenon resulting from the presence of a spurious 3.58 MHz signal, and a "beat signal" occurring at 920 KHz. The beat signal results from the heterodyning of the 41.25 MHz audio signal carrier with the 42.17 MHz color subcarrier, while the 3.58 MHZ distortion is produced by a heterodyning of the 41.25 MHz sound carrier and picture modulation occurring at 44.83 MHz. In the U.S. Pat. application Ser. No. 112,267, filed Feb. 3, 1971, invented by Robert B. Dome and assigned the assignee of the present invention, a circuit for emphasizing the picture carrier is taught in combination with a discriminator circuit for providing an AFC voltage to stabilize the frequency of the IF signal.

In the above-mentioned patent application a reference signal occurring across a resonant circuit and at a frequency corresponding to the resonant or central frequency of the circuit is compared with the picture carrier portion of the IF signal after carrier emphasis has been supplied by the resonant circuit. It has been found, however, that utilizing the emphasized-carrier IF signal as a basis for comparison with the signal derived from the resonant circuit results in a relatively insensitive system, since the IF signal being monitored has already been operated upon by the resonant circuit. Any discrepancy between the frequency being monitored and the central frequency of the resonant circuit is thus minimized, with a resulting detrimental effect on AFC action. Thus, it will be seen that it would be desirable to provide improved means for deriving an AFC voltage in an emphasized carrier system.

It is therefore an object of the present invention to provide improved means for deriving an AFC signal suitable to shift a predetermined portion of an IF signal toward synchronization with the central frequency of a carrier-emphasizing circuit.

It is another object of the present invention to provide means for deriving an AFC signal representing the difference between the central frequency of a carrier-emphasizing circuit, and a predetermined portion of an IF signal before emphasis has been applied thereto.

SUMMARY OF THE INVENTION

Briefly stated, in accordance with one aspect of the present invention a narrow-band resonant circuit tuned to the frequency of the picture carrier portion of an IF signal is coupled to the output of a final IF amplifier. A filter circuit is coupled to the final IF amplifier for abstracting the picture carrier from IF signal applied thereto. A discriminator circuit is coupled to the filter and to the resonant circuit for outputting an AFC voltage. The magnitude and polarity of the AFC voltage represent the phase relationship existing between the signal obtained from the resonant circuit, and that derived by the filter. Drift in the central frequency of the resonant circuit results in the production of a voltage which biases a local oscillator in such a manner as to cause the picture carrier component of the iF signal to approach the central frequency of the resonant circuit.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which the FIGURE represents selected portions of a color television receiver, including emphasized-carrier and AFC circuitry constructed in accordance with the principles of the present invention.

DESCRIPTION OF THE PREFERRED EMBODIMENT

Referring now to the FIGURE, a system providing both sensitive AFC operation and emphasized-carrier detection is shown. It will be noted that the circuit utilizes a single second detector 9. Heretofore, a pair of second detectors have ordinarily been required in order to avoid the presence of spurious signals, including the aforementioned spurious 3.58 MHz signal and a 920 KHz beat which result from the heterodyning of various portions of the received signal. In a copending U.S. patent application entitled "A Single Second Detector System for a Color Television Receiver" by R.B. Dome, Ser. No. 112,136, filed Feb. 3, 1971, and assigned to the assignee of the present application a treatment of the problem is presented in which the 920 KHz luminance distortion coefficient is defined in terms of the product of coefficients $m_2$, $m_3$, and a corresponding coefficient for the spurious 3.58 MHz signal is defined as the product $m_1 m_2$, in $$m_1 = E_1/E_p$$

$$m_2 = E_2/E_p$$

and $$m_3 = E_3/E_p$$

where $E_p$ is the amplitude of the IF picture carrier;

$E_1$ is the amplitude of a sideband 1 MHz from the picture carrier;

$E_2$ is the amplitude of the 41.25 MHz sound carrier; and $E_3$ is the amplitude of the 42.17 MHz color carrier.

It will now be seen that the 920 KHz beat distortion may be represented as $E_2E_3/E_p2$ and the spurious 3.58 MHz distortion as $E_1E_2/E_p2$. It will be appreciated that the magnitude of the distortion coefficients decrease as the relative amplitude of the picture carrier $E_p$ is increased, and the amplitudes of the 41.25 MHz sound carrier, the 42.17 MHz color carrier or the sideband 1 MHz from the picture carrier are decreased. The constitution of the coefficients makes it evident that it is the relative amplitudes of the sideband and of the sound and color carriers with respect to that of the picture carrier that determine the magnitude of the spurious signals, rather than the absolute magnitude of any one component. In the above-mentioned application Ser. No. 112,136, it is proposed that a resonant network be coupled to the transmission path of the signal emanating from a final IF amplifier, before the signal is applied to a single second detector. The resonant or central frequency of the network matches the frequency of $E_p$, the picture carrier portion of the IF signal. By emphasizing $E_p$ or, equivalently, attenuating the other portions of the IF signal, the value of the fractions $E_2E_3/E_p2$ and $E_1E_2/E_p2$ and thus of the coefficients representing the spurious signals are substantially lessened. Of course, compensating circuitry must be provided after the single second detector in order to reestablish the proper relationship between the amplitudes of the detected picture, color and sound signals.

In illustrating a system for emphasizing the subcarrier in this manner, the Dome application Ser. No. 112,267 discloses a circuit including a discriminator for providing an AFC voltage. The voltage is utilized to maintain an IF signal in which the picture carrier frequency substantially matches the resonant frequency of the carrier-emphasizing circuit. However, the circuit disclosed therein, while providing the desired carrier emphasis, produces an AFC control signal which is undesirably insensitive to small differentials between the 45.75 MHz picture carrier and the central frequency of the resonant circuit used to supply carrier emphasis.

In the system disclosed in the FIGURE an RF signal detected by an antenna 1 is applied to a tuner 2 including a mixer 3 and voltage-controlled local oscillator 4. The resulting converted output is applied to an IF amplifier 5, which may comprise one or more stages, and then to a final amplification stage illustrated here as a vacuum tube 6. The amplified IF signal outputted by tube 6 traverses coupling capacitors 7 and 8 and is applied to a second detector 9. The detected signal, bearing luminance, chrominance, and audio information, is then applied to a suitable video amplifier 10. The video amplifier output is applied to an audio stage (not shown) and, by way of 4.5 MHz trap 11, to a video output stage (also not shown). The capacitively coupled signal transmission path is connected by means of a resistor 12 to a resonant circuit 13 comprising a center-tapped inductor 14 and a capacitor 15. A second inductor 16 is coupled from the plate of tube 6 to the screen grid thereof, with a capacitor 17 being connected between screen grid and ground to present a point of essentially ground potential to IF signals. Inductor 16 and the output capacitance of tube 6 form a tuned circuit such that the plate circuit of the tube serves as a constant current source for detector 9. A resistor 18 is provided to couple the screen grid of tube 6 to a source of bias voltage.

Resistor 19 serves to bias the cathode of tube 6 in a manner well known to those skilled in the art. A filter comprising the series combination of a capacitor 20 and an inductor 21 lies in shunt about resistor 19, between the cathode of tube 6 and ground. Coupling capacitor 22 serves to couple the junction between capacitor 20 and inductor 21 to the cathodes of a pair of diodes 23 and 24. Resistors 25 and 26 are connected in shunt with diodes 23 and 24, respectively. The resistively shunted diodes, along with capacitor 27 and the resonant circuit 13 comprised of center-tapped inductor 14 and capacitor 15, serve to constitute a discriminator generally designated at 28. The voltage output of discriminator 28 is taken at the anode of diode 23 and coupled through a resistor 29 to voltage-controlled oscillator 4 for providing automatic frequency control (AFC) to the system.

The operation of the system will now be described, making reference to the numbers of the FIGURE. An intermediate frequency (IF) signal is produced in mixer 3 of the tuner as a result of the combination of a received RF signal and the output of oscillator 4, and is applied to IF amplifier 5. The signal outputted by the initial IF amplification stage 5 is then transmitted to the control grid of tube 6 representing the final IF amplification stage. While the illustrated embodiment shows a plurality of IF amplifiers, it will be understood by those skilled in the art that the number of stages may be varied without departing from the substance of the illustrated embodiment.

The IF signal applied to tube 6 effects a current flow through the tube the characteristics of which reflect those of the signal applied to the control grid. In particular, the current traversing cathode resistor 19, and thus the voltage derived thereacross, reflect the frequency and phase of the signal applied to the control grid of the tube. The voltage across resistor 19 also appears across the series combination of capacitor 20 and inductor 21. The values of capacitor 20 and inductor 21 are selected such that the signal appearing across inductor 21 represents the picture carrier portion of the IF signal applied to the control grid, and is in quadrature therewith.

The picture carrier portion of the signal seen at the input of detector 9, however, has a phase and frequency which reflects the presence of the resonant circuit 13. The resonant circuit is tuned to the picture carrier frequency, and thus serves to emphasize that portion of the IF signal appearing at the plate of the tube which occurs substantially at the picture carrier frequency. The Q of the resonant circuit is relatively high such that the IF frequencies so enhanced or emphasized have a band width of approximately 400 KHz, the central frequency of the band corresponding to the frequency of the picture carrier. As described in copending application, Ser. No. 112,136, the emphasizing of the picture carrier serves to suppress the generation of either a spurious 3.58 MHz signal and a 920 KHz beat signal in detector 9 so that interference with the chrominance signal outputted from video amplifier 10 is substantially eliminated.

It will now be appreciated that it is necessary to provide an IF signal having a picture carrier frequency which is substantially identical to the central frequency of the resonant circuit 13. This remains true even if the central frequency of the resonant circuit drifts due to changes in circuit parameters caused by aging, variations in ambient temperature, etc. For this reason discriminator 28 is provided, along with the filter means including capacitor 20 and inductor 21. The details of the operation of discriminator, well known to those skilled in the art, will not be set forth here, it being apparent that the crossover point of the voltage provided by the discriminator occurs when the signal appearing across inductor 21 is in quadrature with the signal provided by resonant circuit 13.

Should the central frequency of resonant circuit 13 increase slightly, the advance in phase relationship between the signal provided thereby and that of the picture signal appearing across inductor 21 will cause the voltage outputted by discriminator 17 to change in a negative sense. The negative-going voltage thus derived is applied by means of resistor 29 to the voltage-controlled oscillator 4 of tuner 2. The frequency of the oscillator 4 is thereby caused to increase, effecting a corresponding increase in the frequency of the signals appearing at the control grid of tube 6 to reduce the difference between the picture carrier frequency appearing at this point and the central frequency of resonant circuit 13.

On the other hand, should the central frequency of resonant circuit 13 decrease slightly the voltage provided by discriminator 28 will change in a positive sense. The positive-going voltage is applied to oscillator 4, decreasing the frequency of the signal provided thereby and thus decreasing the frequency of the picture carrier portion of the signals applied to vacuum tube 6 so that the picture carrier frequency again approaches the central frequency of resonant circuit 13.

It will now be seen that the present system provides a far more sensitive AFC response than would be the case if the output of discriminator 28 represented the phase difference between a signal produced across resonant circuit 13, and the already-emphasized picture carrier signal. Instead, the present system serves to compare the signal appearing across the resonant circuit with a picture signal before emphasis occurs, so that disparities in frequency or phase are far more apparent.

While it will be understood that the values of the various circuit components may be varied to suit a particular application, the following values of circuit components are given by way of example:

| | |
|---|---|
| Tube 6 | 6JC6 |
| Resistors: | |
| **12** | 68 ohms |
| **18** | 4400 ohms |
| **19** | 100 ohms |
| **25** | 47 Kilohms |
| **26** | 47 Kilohms |
| **29** | 100 Kilohms |
| Capacitors: | |
| **7** | 800 picofarads |
| **8** | 800 picofarads |
| **15** | 100–150 picofarads |
| **17** | 560 picofarads |
| **20** | 33 picofarads |
| **22** | 800 picofarads |
| **27** | 800 picofarads |
| Diodes: | |
| **23** | IN87A |
| **24** | IN87A |

Inductors:

| | |
|---|---|
| 14 | 0.1 microhenrys |
| 16 | 6.8 microhenrys |
| 21 | .22–.55 microhenrys |

As will be evident from the foregoing description, certain aspects of the invention are not limited to the particular details of construction of the circuit illustrated, and it is contemplated that other modifications or applications will occur to those skilled in the art. As set forth above, proper operation of the present invention is not dependent upon the number of IF stages provided, nor is it necessary that final IF amplification be provided by the specific device shown. Further, other suitable means may be provided to derive suitable comparison frequencies without departing from the invention as herein defined. It is therefore intended that the appended claims shall encompass all such modification and applications as do not depart from the true spirit and scope of the invention.

What is claimed as new and desired to be secured by Letters Patent of the United States is:

1. In a color television receiver including tuner means for deriving an IF signal from a received RF signal, means for amplifying said IF signal, and means for varying the frequency of the IF signal;

resonant circuit means coupled to said IF signal amplifying means for selectively attenuating predetermined portions of said IF signal;

discriminator means for comparing the phase of the signal developed by said resonant circuit means with a predetermined portion of an IF signal applied to the IF amplifier means, said discriminator means producing a signal representative of the phase relationship between said signal developed by said resonant circuit means and said predetermined portion of said IF signal; and means for applying said signal outputted by said discriminator means to the means for varying the frequency of said IF signal.

2. The invention as defined in claim 1, wherein said discriminator means includes filter means for deriving said predetermined portion of an IF signal from the signal applied to said IF signal amplifying means.

3. The invention as defined in claim 2, wherein said resonant circuit means comprises the parallel combination of an inductance and a capacitance.

4. In a color television receiver including IF amplifier means, tuner means for converting a received RF signal to an IF signal, said tuner means being adapted to vary the frequency of the IF signal outputted thereby in response to a control signal, and single second detector means for detecting luminance, chrominance and audio signals from an IF signal provided by the IF amplifier means:

circuit means for effecting an increase in the relative amplitude of a predetermined portion of said IF signal; and means for providing a control signal to be applied to said tuner means, said last-named means including means for comparing the phase of said predetermined portion of said IF signal with the phase of a corresponding portion of the IF signal before the increase in the relative amplitude thereof has been effected.

* * * * *